(12) United States Patent
Le

(10) Patent No.: US 10,151,967 B2
(45) Date of Patent: *Dec. 11, 2018

(54) ELECTRONIC STABILIZING SYSTEM FOR A CAMERA

(71) Applicant: Letus Corporation, Portland, OR (US)

(72) Inventor: Hien Tu Le, Happy Valley, OR (US)

(73) Assignee: Letus Corporation, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,526

(22) Filed: Feb. 13, 2017

(65) Prior Publication Data

US 2017/0153532 A1 Jun. 1, 2017

Related U.S. Application Data

(63) Continuation of application No. 14/674,784, filed on Mar. 31, 2015, now Pat. No. 9,605,795.

(60) Provisional application No. 61/996,045, filed on Apr. 4, 2014, provisional application No. 61/982,096, filed on Apr. 21, 2014.

(51) Int. Cl.
| | |
|---|---|
| F16M 11/00 | (2006.01) |
| G03B 17/56 | (2006.01) |
| F16M 13/04 | (2006.01) |
| F16M 11/10 | (2006.01) |
| F16M 11/18 | (2006.01) |
| F16M 11/20 | (2006.01) |
| F16M 13/00 | (2006.01) |
| H04N 5/232 | (2006.01) |

(52) U.S. Cl.
CPC .......... *G03B 17/561* (2013.01); *F16M 11/105* (2013.01); *F16M 11/18* (2013.01); *F16M 11/2064* (2013.01); *F16M 13/00* (2013.01); *F16M 13/04* (2013.01); *G03B 17/563* (2013.01); *F16M 2200/04* (2013.01); *H04N 5/23248* (2013.01)

(58) Field of Classification Search
CPC ....... B64D 47/08; B64C 39/024; F16M 13/02
See application file for complete search history.

(56) References Cited

U.S. PATENT DOCUMENTS

| | | |
|---|---|---|
| 7,658,555 B1 | 2/2010 | Moilanen |
| 8,408,820 B2 | 4/2013 | Manson |
| 8,485,740 B1 | 7/2013 | Chapman |
| 8,721,198 B2 | 5/2014 | Chapman |
| 8,837,927 B2 | 9/2014 | Yevstratov et al. |
| 8,861,947 B2 | 10/2014 | Webb et al. |

(Continued)

*Primary Examiner* — Amy J. Sterling
(74) *Attorney, Agent, or Firm* — Schwabe, Williamson & Wyatt, P.C.

(57) ABSTRACT

In embodiments, a roll axis assembly may include a camera mounting plate to mount with a camera such that an optical axis of the camera is approximately parallel with the camera mounting plate and coincident with a first axis of the apparatus. The roll axis assembly may further include a roll motor coupled with the camera mounting plate, the roll motor to rotate the camera mounting plate around the first axis. The apparatus may further include a pan/tilt axis assembly coupled with the roll axis assembly, the pan/tilt axis assembly to rotate the camera mounting plate around a second axis of the apparatus that is perpendicular to the first axis of the apparatus and also perpendicular to the camera mounting plate. Other embodiments may be described and/or claimed.

9 Claims, 13 Drawing Sheets

(56) References Cited

U.S. PATENT DOCUMENTS

| | | |
|---|---|---|
| 8,908,090 B2 | 12/2014 | Webb |
| 2009/0179127 A1 | 7/2009 | Pettey |
| 2010/0079101 A1 | 4/2010 | Sidman |
| 2017/0106998 A1* | 4/2017 | Zhou .................. B64D 47/08 |

* cited by examiner

ELECTRONIC STABILIZING SYSTEM FOR A CAMERA

CROSS-REFERENCE TO RELATED APPLICATIONS

This application is a continuation of U.S. patent application Ser. No. 14/674,784, filed Mar. 31, 2015, entitled ELECTRONIC STABILIZING SYSTEM FOR CAMERA, which claims priority to U.S. Provisional Application 61/982,096, filed Apr. 21, 2014, and U.S. Provisional Application 61/996,045, filed Apr. 4, 2014, the contents and disclosure of which are hereby incorporated by reference in their entireties.

TECHNICAL FIELD

Embodiments herein relate to stabilization systems and more specifically to an electronic stabilizing system for stabilizing imaging devices such as cameras along multiple axes.

BACKGROUND

Modern camera systems may be configured to rotate around one or more axes. This rotation may introduce undesirable jitteriness or variation to video or images produced by the camera. Additionally, this rotation may cause the field of view of the camera to move in an unnatural and/or undesirable manner.

DETAILED DESCRIPTION OF EMBODIMENTS OF THE INVENTION

Figure 1:
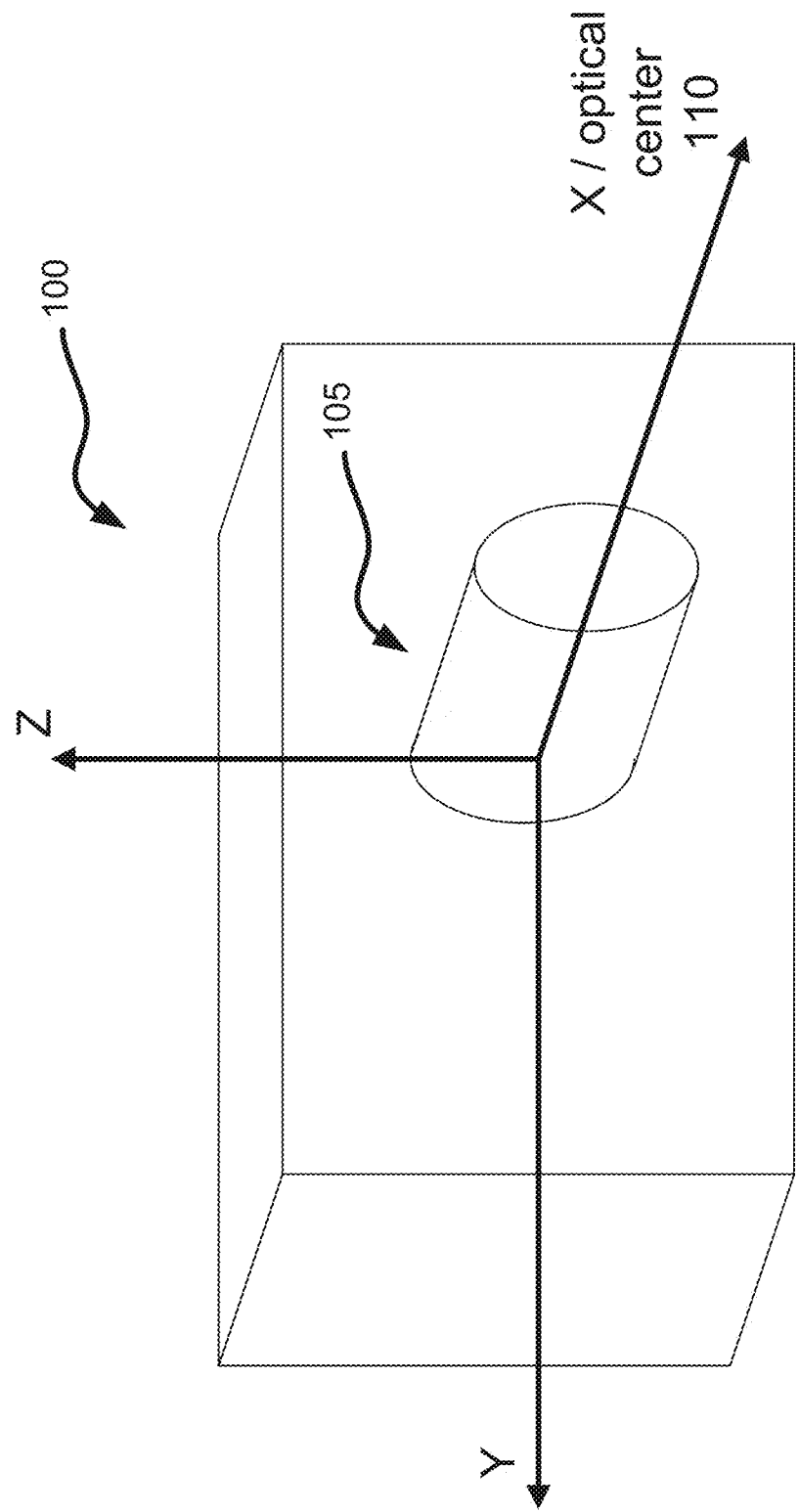
FIG. 1 depicts an example of various axes that may be referred to herein, in accordance with various embodiments.

Embodiments of the present disclosure generally relate to a stabilization apparatus that may include or involve gyroscopic feedback. The stabilization apparatus may include a motor control board with one or more gyroscopic sensors, one or more adjustable mounting plates, one or more balancing motors to rotate elements of the stabilization apparatus around a pan, tilt, and/or roll axis, and/or one or more slip ring(s) for power and/or signal connections. Embodiments of the present disclosure may additionally include a fourth axis assembly that may include a cross bar that houses a main pan bearing. Two riser bars may extend up from the cross bar, and one or more pitch bearings may be coupled with respective riser bars. The entire assembly may be configured to connect to one or more third party mount(s) via a spacer ring, while in other embodiments the spacer ring may not be included.

Embodiments disclosed herein may provide a stabilization apparatus to stabilize one or more cameras along one or more axes. Embodiments may also provide a primary axis of stabilization that may be directly attached to or coincident with an optical center or optical axis of a camera. Specifically, embodiments may provide a stabilization apparatus for cameras that may dynamically stabilize motion along one or more of the X, Y, and/or Z axes of the camera or stabilization apparatus. In embodiments, the stabilization apparatus may align the roll axis of the stabilization apparatus with the optical center of the camera. In some embodiments, the stabilization apparatus may include a tri-axial weight balancing system to balance the weight of the camera around the rotational center of the camera and/or stabilization apparatus. In some embodiments, the stabilization apparatus may utilize one or more slip-ring connections for power and/or signal leads, thereby allowing a full 360 degrees of rotation about the roll axis of the stabilization apparatus without twisting wiring of the power and/or signal leads. In some embodiments, the stabilization apparatus may allow for multiple mounting orientations, thereby allowing the camera to be positioned in a plurality of possible directions. In some embodiments, wiring associated with the power and/or signal leads may be integrated into framework of the stabilization apparatus to reduce loose wiring in and around the stabilization apparatus.

In some embodiments, the stabilization apparatus may include an additional axis mount, herein referred to as a fourth axis assembly, for adding an additional axis of stabilization to the stabilization apparatus. Specifically, the fourth axis assembly may allow the stabilization apparatus to rest on a supporting arm that may bear some of the weight of the stabilization apparatus. In some embodiments, the fourth axis assembly may allow the stabilization apparatus to either be supported from below or suspended from above. In some embodiments, the fourth axis assembly may allow freedom of movement on both pan and tilt rotational axes. In some embodiments, the fourth axis assembly may include or be able to couple with a spring loaded support arm or top-mounted suspension cable that may absorb and reduce/negate vertical movement of the stabilization apparatus. In embodiments, the fourth axis assembly may generally result in the stabilization apparatus having a mounting bracket that may provide flexibility in using various products that may be on the market currently or in the future. Generally, the products may provide stabilization and/or reduction of externally imposed translational motion in the vertical direction.

In the following detailed description, reference is made to the accompanying drawings that form a part hereof, and in which are shown by way of illustration embodiments that may be practiced. It is to be understood that other embodiments may be utilized and structural or logical changes may be made without departing from the spirit or scope of the present disclosure. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB); that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

FIG. 1 depicts an example of various axes that may be referred to herein, in accordance with various embodiments. Specifically, the axes are generally depicted with respect to a camera 100 with a lens portion 105. As can be seen, the x axis may be generally coaxial or coincident with the lens portion 105, and may be generally considered to be parallel to the optical center 110 of the camera 100 and/or the lens portion 105. In some embodiments, as discussed below (and not shown in FIG. 1), the optical center of the camera 110 may be parallel, but not coxial, with the x axis. In some embodiments, movement along the x axis may be referred to as movement toward the "front" or the "back" of the camera, and rotation around the x axis may generally be referred to as "roll" motion.

The y axis may be generally perpendicular to the x axis, as shown in FIG. 1. Movement along the y axis may generally be referred to as side-to-side movement with respect to the camera. Rotation around the y axis may generally be referred to as "tilt" of the camera 100.

The z axis may be generally perpendicular to both the x axis and the y axis, as shown in FIG. 1. Movement along the z axis may generally be referred to as "up" or "down" movement of the camera. Rotation around the z axis may generally be referred to as "pan" and/or "pan" movement of the camera 100. It will be understood that the use of camera 100 is merely an example to illustrate the different x, y, and z axes. Additionally, designators such as x/y/z, front/back/side/up/down, and/or roll/tilt/pan/pan are designators used for the sake of this description. In some embodiments, the axes may be renamed, but still describe movement or rotation that is similar to those discussed herein.

Figure 2:
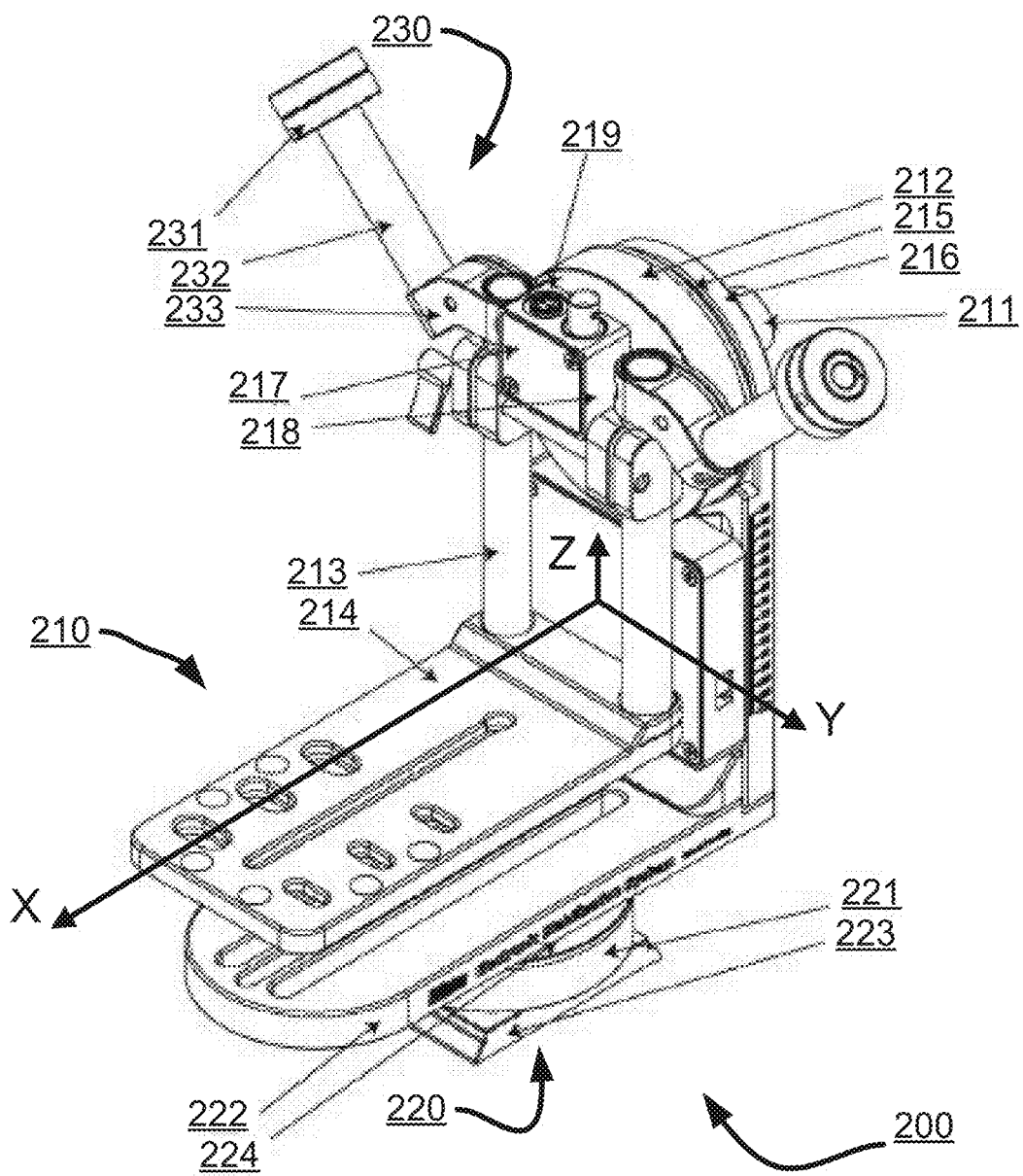
FIG. 2 depicts an upper perspective view of a stabilization apparatus, in accordance with various embodiments.
Figure 3:
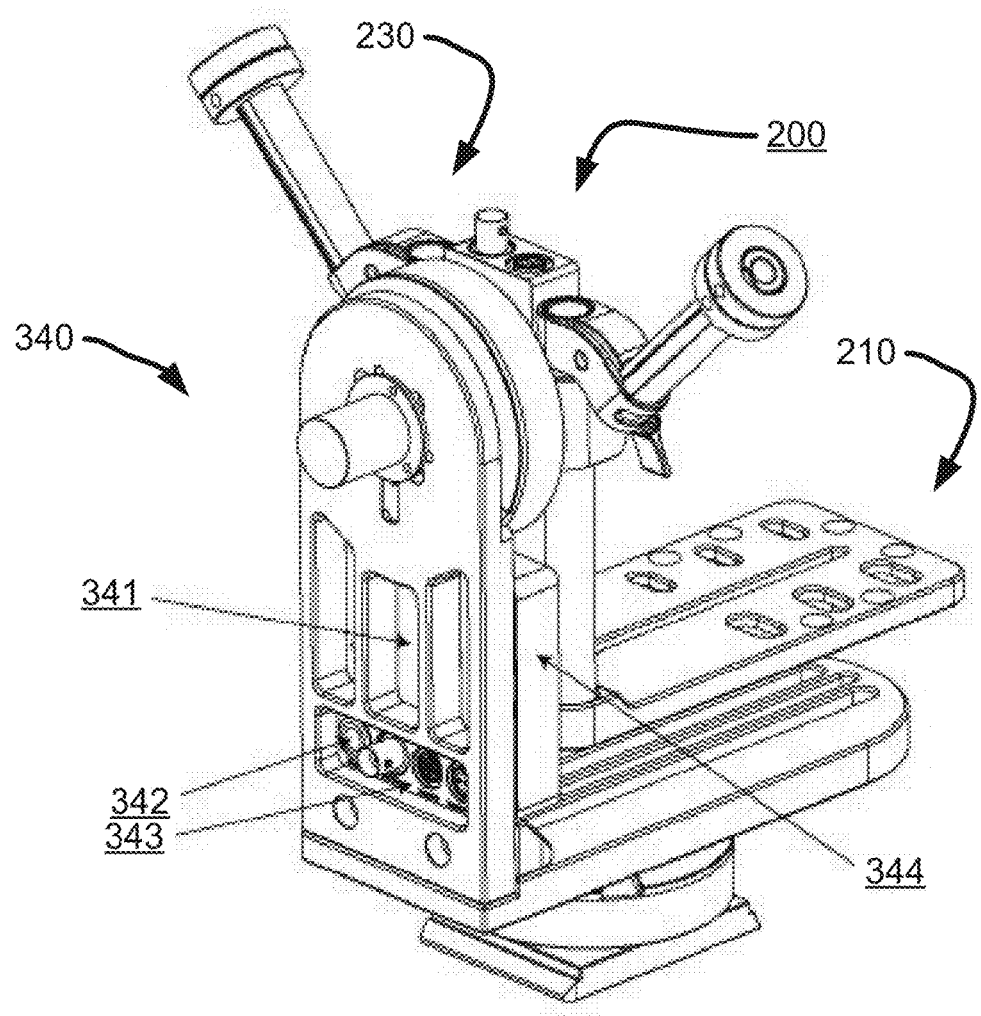
FIG. 3 depicts an alternative upper perspective view of the stabilization apparatus, in accordance with various embodiments.

FIG. 2 depicts an upper perspective view of a stabilization apparatus 200 that includes a two-axis configuration, in accordance with various embodiments. FIG. 3 depicts an alternative upper perspective view of the stabilization apparatus 200. In FIG. 2, the x, y, and z axes are depicted, and generally correspond to the x, y, and z axes discussed with respect to FIG. 1, above. A general description of the elements of the stabilization apparatus is as follows.

In embodiments, a roll axis assembly 210 may include a camera mounting plate 214 that is configured to attach to a roll stabilizing motor 212 via one or more height adjusting rods 213. In embodiments, the camera mounting plate 214 may be configured to couple directly with a camera such as a digital camera, a video camera, or some other type of camera or image capture device such that the optical center of the camera (e.g., optical center 110 of camera 100 of FIG. 1) is generally parallel with the x axis and facing away from, for example, the roll stabilizing motor 212. The roll axis assembly 210 may further include a motor mounting plate 216 that is coupled with the roll stabilizing motor 212 directly or via a rotational bearing such as rotational bearing 215. In some embodiments (not shown), the rotational bearing 215 may be considered optional and not be an element of the roll axis assembly 210. The roll axis assembly 210 may further include a sensor board 217 and/or a sensor board housing 218 that may be mounted on the roll-axis assembly 210. Specifically, the sensor board 217 and/or sensor board housing 218 may be mounted directly in line with the rotational axis of the roll stabilizing motor 212 to assure proper calibration of one or more sensors of the sensor board 217. In other embodiments, such as the embodiment depicted in FIG. 2, the sensor board housing 218 may not be in line with the rotational axis of the roll stabilizing motor 212. As described herein, the x axis depicted in FIG. 1 or 2 may be considered to be coincident to the rotational axis of the roll stabilizing motor 212 such that rotation of the roll stabilizing motor 212 causes rotation about the x axis (i.e., the roll axis).

In some embodiments the sensor board 217 may include one or more sensors such as gyroscopic sensors, an accelerometer, a global positioning system (GPS) sensor, or some other type of sensor. A power/signal breakout box 219 may be coupled with the motor mounting plate 216, and coupled with a power/signal distribution system 340 via an electrical slip ring 211. The electrical slip ring 211 may allow the power/signal breakout box 219 to exchange signals with one or more components of the power/signal distribution system 340 while the roll axis assembly rotates about the x axis without wires of the power/signal breakout box 219 and/or power/signal distribution system 340 becoming tangled or crossed. The power/signal distribution system 340 is described in further detail below.

The stabilization apparatus 200 may further include a tri-axial weight balancing assembly 230 coupled with the roll axis assembly 210. In embodiments, the tri-axial weight balancing assembly 230 may be coupled with the roll axis assembly 210 via one or more height adjusting rods such as height adjusting rods 213. The tri-axial weight balancing assembly 230 may include, for example, two weight rod clamps 233 that may be distributed generally 45° from the z axis along the y axis as shown in FIGS. 2 and 3. Two counter-weight rods 232 may extend out from the weight rod clamps 233 forming a generally "Y" shaped configuration as shown in FIGS. 2 and 3. Counter weights 231 may then be added to the counter-weight rods 232 to aid in balancing the entire roll axis assembly 210 and/or a camera coupled with the roll axis assembly 210 along the rotational axis of the roll stabilizing motor 212. In other embodiments, the tri-axial weight balancing assembly 230 may include more or fewer weights 231, weight rod clamps 233, and/or counter-weight rods 232. In some embodiments, the weight rod clamps 233 and/or counter-weight rods 232 may be arranged in a different configuration than that shown in FIGS. 2 and 3. The tri-axial weight balancing assembly 230 will be described in further detail below.

The roll axis assembly 210 may be coupled with a pan/tilt axis assembly 220 via connection of the roll axis motor mounting plate 216 to a pan/tilt motor mounting plate 222. In some embodiments, the roll axis motor mounting plate 216 may be coupled with the pan/tilt motor mounting plate 222 at a 90° angle, while in other embodiments the roll axis motor mounting plate 216 may be coupled with the pan/tilt motor mounting plate 222 at a different angle. A pan/tilt stabilizing motor 221 may be directly coupled with the motor mounting plate 222 in some embodiments, while in other embodiments the pan/tilt stabilizing motor 221 may be coupled with the motor mounting plate 222 via a rotational bearing 224. Specifically, the rotational bearing 224 may be desired if extra weight tolerance is desired for the stabilization apparatus 200 and/or the pan/tilt axis assembly 220. A base mounting plate 223 may be attached to the opposite side of the pan/tilt stabilizing motor 221, thereby allowing the stabilization apparatus 200 to be mounted to a holding platform such as a camera tripod or a camera holding vest (not shown).

In some embodiments, the power/signal distribution system 340 discussed above may be a modular unit mounted to the motor mounting plate 222. However, in other embodiments the power/signal distribution system 340 may be coupled with the stabilization apparatus 200 in a different location. The power/signal distribution system 340 may include one or more circuit boards such as circuit board 341 that may include circuitry or logic that controls the operation of the stabilization apparatus 200. Specifically, the circuit board(s) 341 may direct or facilitate rotation of one or more of the roll stabilizing motor 212, and/or the pan/tilt stabilizing motor 221 based on signals from one or more sensors of the sensor board 217. The power/signal distribution system 340 may further include one or more power/signal plug connectors 343 that may allow for power/signal pass-through and processing from the power/signal distribution system 340 to or from one or more external electronic devices. The configuration and function of the power/signal plug connectors 343 may vary depending on the particular setup or composition of the circuit board 341, the sensor board 217, and/or the power/signal breakout box 219. In some embodiments, the power/signal distribution system 340 may include one or more control buttons 342 that may be related to or cause one or more functions or operations to be performed by the circuitry or logic of the circuit board(s) 341. Generally, one or more of the circuit board(s) 341, the power/signal plug connector(s) 343, and/or the control button(s) 342 may be at least partially protected from damage by a power/signal distribution system housing 344. The size of the power/signal distribution system housing 344 may vary depending on the number of components of the power/signal distribution system 340 it includes. In some embodiments, radio frequency (RF) signal reducing materials may be utilized with the power/signal distribution system housing 344 to aid in eliminating signal noise in the power/signal distribution system 340 and/or the stabilization apparatus 200 in general. In embodiments, the power/signal distribution system housing 344 may include one or more controller boards that may be coupled with, and configured to control, one or more of the stabilizing motors and/or sensors described herein. For example, the one or more controller boards may be coupled with the pan/tilt stabilizing motor 221, the roll stabilizing motor 212, or some other motor described herein. Further details of elements of the stabilization apparatus 200 are given below:

Roll Axis Assembly

Generally, the primary axis of stabilization that is attached directly to the camera may be considered to be the roll axis via the roll axis assembly 210. As noted above, the roll axis may be considered to be the same as the x axis depicted in FIG. 1 or 2, and rotation about the x axis may be considered to be "roll." The roll axis may be considered to be the foundational axis for the stabilization apparatus 200. Generally, the roll stabilizing motor 212 may control the roll of the roll axis assembly 210, and particularly a camera when the camera is coupled with the camera mounting plate 214. The roll axis assembly 210 may be coupled with a power/signal distribution system 340 via an electrical slip ring 211, as noted above, which may allow for full 360 degree rotations of the roll axis assembly 210 without twisting wiring of the stabilization apparatus 200. The center of the roll stabilizing motor 212 may be aligned with the center of the camera's optical center, as discussed above with respect to FIG. 1 such that the optical center 110 of the camera is coincident or coaxial with the x axis as shown in FIG. 1. As used herein, the terms "coincident" and "coaxial" are used interchangeably.

Generally, the roll axis may stabilize the horizontal plane of the camera view. The camera may be mounted to the camera mounting plate 214, and further adjusted vertically using the height adjusting rods 213. In some embodiments, the camera may be raised or lowered vertically (i.e., along the z axis) so the optical center of the camera, e.g., optical center 110, may be aligned with or coaxial with the center of the roll stabilizing motor 212 and thereby the rotational axis of the roll stabilizing motor 212 (i.e., the roll axis). In other embodiments, raising or lowering the camera vertically may not bring optical center 110 to be coaxial with the roll axis. Thus, when the roll stabilizing motor 212 rotates around the rotational axis of the roll stabilizing motor 212, roll axis assembly 210 and the camera rotate around both the x axis and the camera's optical center 110. In some embodiments, the counter weights 231 may then be added, removed, or otherwise adjusted with respect to the counter-weight rods 232. The counter weights 231 may be used to adjust the center of gravity of the roll axis assembly 210 once it is coupled with camera 100 such that the center of gravity of the roll axis assembly 210/camera 100 is generally on the roll axis, as described in further detail below.

By using an electrical slip ring 211, the camera may be free to rotate 360 degrees around the roll axis without wiring being twisted or bound by the motion. The power/signal breakout box 219 may be connected to the power/signal distribution system 340 through the electrical slip ring 211.

Figure 6:
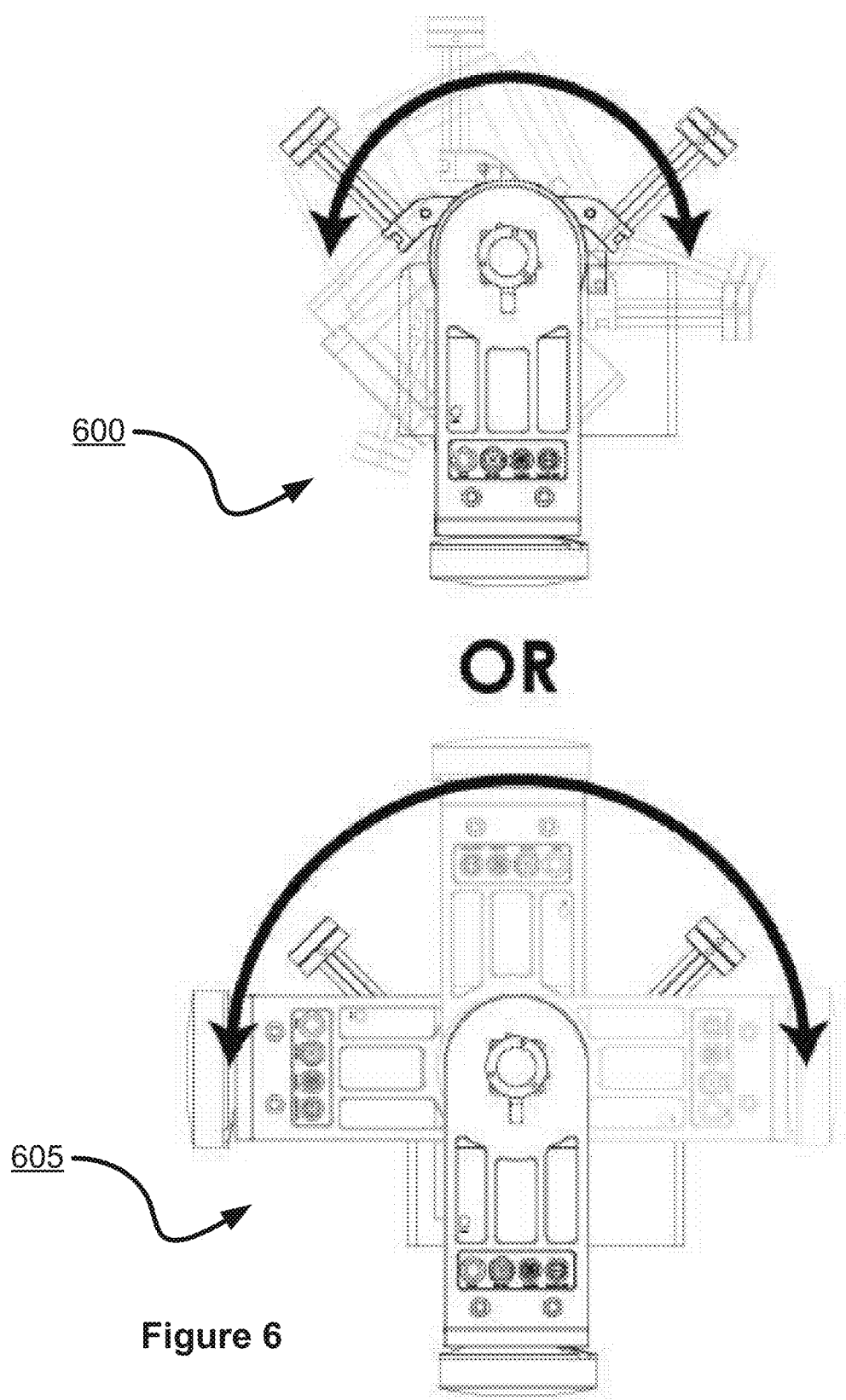
FIG. 6 is a rear view depicting rotation of the stabilization apparatus, in accordance with various embodiments.

The roll axis assembly 210 is also designed so it clears other elements of the stabilization apparatus 200. This may allow the mounting point of the stabilization apparatus 200, e.g., the camera mounting plate 214, to fully rotate around the camera in a 360 degree motion. This full rotation may allow the user to swing the camera from a bottom mounted orientation to a side or top mounted orientation while keeping the camera horizon level. This sort of rotation may be seen, for example, in FIG. 6. Specifically, the rotation shown at 600 may depict the pan/tilt axis assembly 220 staying relatively still while the roll axis assembly 210, and particularly the camera, rotate around the x axis. By contrast, the rotation shown at 605 may depict the roll axis assembly 210, and particularly the camera, staying relatively still while the pan/tilt axis assembly 220 rotates about the x axis.

In some embodiments, because the x axis of the roll axis assembly 210 is coincident with or otherwise aligned with the optical center 110 of the camera, changing lenses on a camera may not affect the balance of roll axis assembly 210 when the camera is coupled with the camera mounting plate 214. Generally, because camera lenses may be cylindrical, the change of weight due to changing camera lenses may not affect balance as the weight is centered on the optical center 110 of the camera, which may be the same as the x axis of the roll axis assembly 210.

In some embodiments, the roll stabilizing motor 212 may be further reinforced through the use of a rotational bearing 215, which may allow for heavier payloads that may otherwise overwhelm the roll stabilizing motor 212's lateral support limits. In different embodiments, different components of the roll axis assembly 210 may be scaled up or down to accommodate larger or smaller camera platforms. In some embodiments, the roll stabilizing motor 212 and/or the roll axis assembly 210 may be manually controlled to generate manual roll functions via an external control interface (not shown).

Pan/Tilt Axis Assembly

As noted above, in some embodiments the stabilization apparatus 200 may include a pan/tilt axis assembly 220 that may include a pan/tilt stabilizing motor 221. The pan/tilt stabilizing motor 221 may be used for either a pan or tilt movement of the camera and/or the roll axis assembly 210, depending on how an end user attaches the stabilization apparatus 200 to a mounting platform.

Generally, the pan/tilt axis assembly 220 may remove unwanted pan/tilt motion of the camera, the roll axis assembly 210, and/or the stabilization apparatus 200. Additionally or alternatively, the pan/tilt axis assembly 220 may be configured to smooth out intentional pan/tilt movements of the camera, the roll axis assembly 210, and/or stabilization apparatus 200. Orienting the base mounting plate 223 horizontally (i.e., as shown in FIGS. 2 and 3) may create a pan compensating configuration. That is, rotation about the z axis may be compensated for by the pan/tilt axis assembly 220. Alternatively, by orienting the base mounting plate 223 vertically (i.e., perpendicularly to the configuration shown in FIGS. 2 and 3 so that the base mounting plate 223 is generally parallel with the z axis), the pan/tilt axis assembly 220 may serve as a tilt compensating configuration. This flexibility may allow the user to choose which mounting configuration best meets his or her stabilization requirements for a given situation.

The pan/tilt motor mounting plate 222 may be slotted so the position of the roll axis assembly 210 may be moved forward and backward. This flexibility may allow the user to center the weight of the roll axis assembly 210 and/or the camera over the rotational center of the pan/tilt stabilizing motor 221.

In embodiments, components of the pan/tilt axis assembly 220 may be scaled up or down depending on factors such as the size or weight of the camera being used. A rotational bearing 224 may also be utilized to reduce strain on the pan/tilt stabilizing motor 221. In addition to stabilization, the pan/tilt stabilizing motor 221 or one or more other components of the pan/tilt axis assembly 220 may be manually controlled to produce manual pan/tilt rotation of the camera, the roll axis assembly 210, and/or the stabilization apparatus 200 via an external control interface (not shown).

In some embodiments, although not shown in FIG. 2, elements of the pan/tilt axis assembly 220 may be separable from one another. For example, the base mounting plate 223 may be permanently coupled with or integrated into the third axis assembly 400 and removably coupled with the pan/tilt motor mounting plate 222. One or both of the rotational bearing 224 and the pan/tilt stabilizing motor 221 may further be coupled with the base mounting plate 223. The pan/tilt motor mounting plate 222 may be removably coupled with the remainder of the pan/tilt axis assembly 220. In other embodiments the pan/tilt motor mounting plate 222 may be split into two portions, one of which is coupled with the roll axis assembly 210, and the other of which is coupled with the remainder of pan/tilt axis assembly 220 (not shown). For example, the portion of the pan/tilt motor mounting plate 222 that is coupled with the roll axis assembly 210 may be configured to nest within the portion of the pan/tilt motor mounting plate 222 that is coupled with the remainder of the pan/tilt axis assembly 220 and the third axis assembly 400. The portion of the pan/tilt motor mounting plate 222 that is coupled with the roll axis assembly 210 may be held within the portion of the pan/tilt motor mounting plate 222 that is coupled with the remainder of the pan/tilt axis assembly 220 and the third axis assembly 400 by one or more clamps, screws, bolts, adhesives such as Velcro, tape, or some other fastener. This configuration may allow the portion of the pan/tilt motor mounting plate 222 that is coupled with the roll axis assembly 210, and the roll axis assembly 210 itself, to be disengaged from the pan/tilt stabilizing motor 221 such that the stabilizing apparatus 200 only stabilizes the camera 100 around the roll axis.

Tri-Axial Weight Balancing Assembly

The tri-axial weight balancing assembly 230 may use the camera as the first point of a balance triangle. Two counter-weight rods 232 may then be extended out at approximately 120° angles to form a triangular shape off of the axis of the camera. The counter-weight rods 232 may be used for mounting one or more counter weights 231. Generally, this configuration of the tri-axial weight balancing assembly 230 may allow the user to easily center the weight of the camera along the x axis of the roll axis assembly 210, and specifically the rotational axis of the roll stabilizing motor 212. As described above, embodiments of the tri-axial weight balancing assembly 230 may use a "Y" shaped balancing layout. The camera mounted to the camera mounting plate 214 may provide the weight on the bottom leg of the "Y." Through the use of the weight rod clamps 233 attached to the height adjusting rods 213 of the roll axis assembly 210, two counter-weight rods 232 may extend on which counter weights 231 may be positioned. By altering the amount and location of counter weights 231, the overall weight of the "Y" shaped configuration may be changed and centered on the rotational axis of the roll stabilizing motor 212. That is, the center of gravity of the roll axis assembly 210, the camera 100, and the tri-axial weight balancing assembly 230 (and any accessories that may be attached to the camera) may be aligned to be on the roll axis of the stabilizing apparatus 200. Having the camera and assembly balanced along the rotational axis of the roll stabilizing motor 212 may reduce strain on the roll stabilizing motor 212 and allows for proper operation.

In embodiments, the tri-axial weight balancing assembly 230 may be scaled appropriately for the camera in use. In some situations, the tri-axial weight balancing assembly 230 may be eliminated from the setup if the camera is able to be center balanced using its own weight and position, that is if the center of gravity of the camera 100 and the roll axis assembly 210 is generally on the roll axis of the stabilization apparatus without the use of the tri-axial weight balancing assembly 230. In some embodiments, the tri-axial weight balancing assembly 230 may only use one of the two depicted weight rod clamps 233, counter-weight rods 232, and/or counter weights 231. In other embodiments the tri-axial weight balancing assembly 230 may use more than two weight rod clamps 233, counter-weight rods 232, and/or counter weights 231. In some embodiments, the weight rod clamps 233 may be configured such that the counter-weight rods 232 extend in a direction different than that shown in FIG. 2. For example, the counter-weight rods 232 may point generally downward, laterally, forward, etc. from the tri-axial weight balancing assembly 230. The description of the "Y" shape and 120° angles is intended merely as a description of one embodiment and may be different in different embodiments. Generally, the weight rod clamps 233, counter-weight rods 232, and/or counter weights 231 may be configured to account for the uneven weight distribution of a camera 100 and camera accessories and may be used to bring the center of gravity of the collective assembly of objects coupled with the camera 100 and rotating around the roll axis into alignment with the roll axis itself.

Power/Signal Distribution System

Utilizing slip-ring connections for the electrical components may allow full 360 degree motion of the roll axis assembly 210 about the x axis without breaking, tangling, or otherwise damaging or affecting wiring of the stabilization apparatus 200. Specifically, the roll axis assembly 210 may be able to rotate more than one time, or an indefinite number of times, about the x axis based on the use of the slip-ring connections for the electrical components. Generally, the power/signal distribution system 340 may control the motion of stabilizing motors such as the roll stabilizing motor 212 and/or the pan/tilt stabilizing motor 221. The power/signal distribution system 340 may also provide a power/signal pass-through for connecting the camera to external elements. Wiring, where possible, may be at least partially run inside the frame of the stabilization apparatus 200. Running the wire inside the frame of the stabilization apparatus 200 may reduce the risk of wiring being snagged and/or broken.

One or more circuit boards 341 related to motor control may be at least partially positioned within the housing 344. The housing 344 may also include, but is not limited to, one or more control button(s) 343, one or more power/signal plug connector(s) 342, and/or additional circuit boards.

In embodiments, the power/signal plug connector(s) 342 may be a straight pass-through or may be processed by one or more additional circuits. A power limiting circuit, for example, may be applied to a power plug to reduce the risk of over powering an attached component.

The power/signal distribution system 340 may have a modular design so the placement of the housing 344 may be altered to best suit the particular setup or use of the stabilization apparatus 200. Additional pass-through or converting connections may be incorporated into the power/signal distribution system 340 in other embodiments.

Third Axis Assembly

Figure 4:
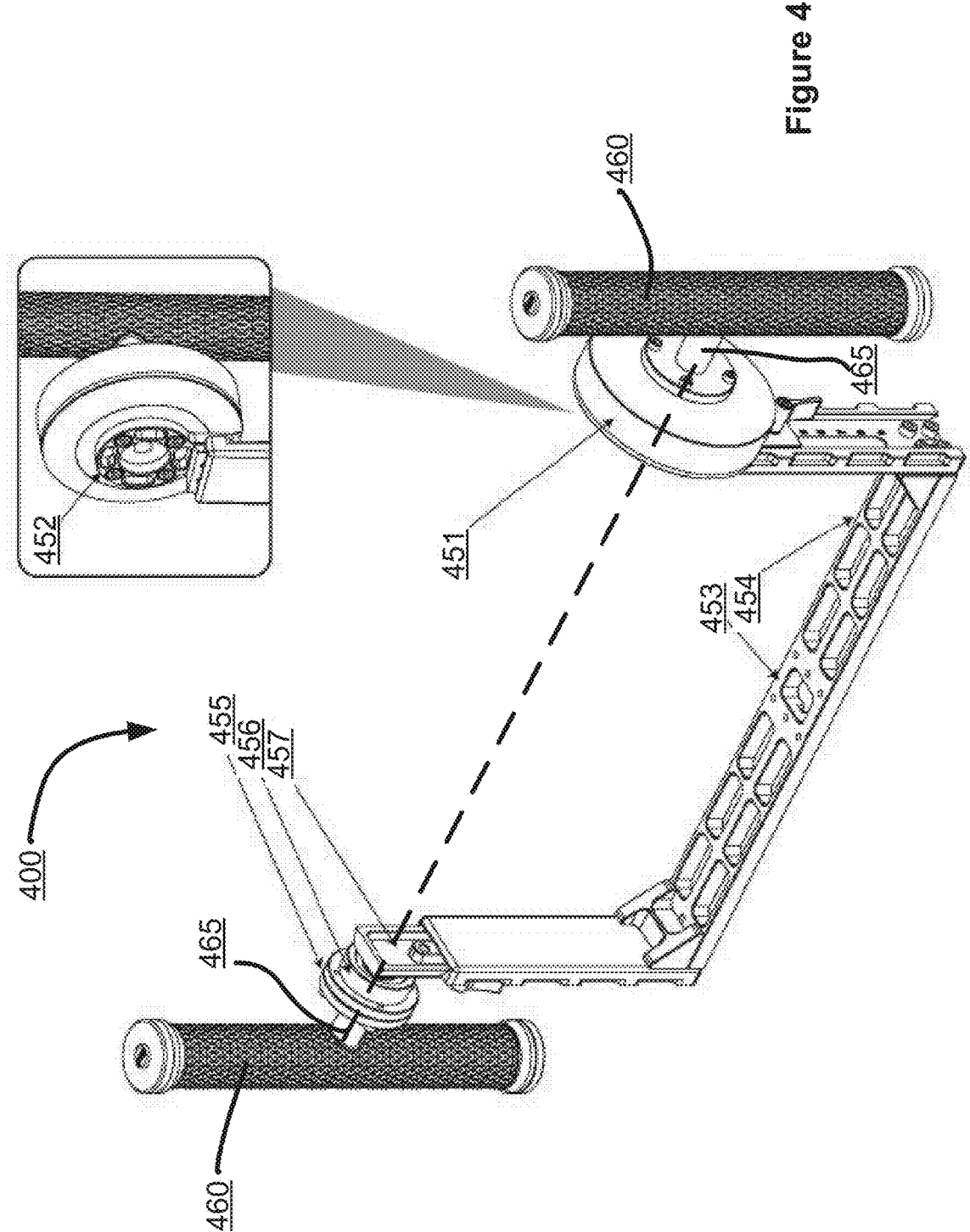
FIG. 4 is an upper perspective view of a third axis assembly of the stabilization apparatus, in accordance with various embodiments.

In some embodiments, the electronic stabilization apparatus 200 may be coupled with a third axis assembly 400 as shown in FIG. 4. The third axis assembly 400 may optionally or permanently be attached to the base mounting plate 223. Specifically, the third axis assembly 400 may be attached to the roll axis assembly 210 and pan/tilt axis assembly 220 by attaching the bracket mounting plate 453 to the base mounting plate 223. The third axis assembly 400 may provide an additional axis of stabilization or motion control by utilizing the third axis stabilizing motor 451. This third axis stabilizing motor 451 may be attached either directly to a motor mounting plate 452, or via a rotational bearing 456 if needed. The motor mounting plate 452 may be attached to a cross arm 454 which may include one or more handle mounting points 455. Handles 460 may be attached to the third axis assembly 400 at handle mounting points 455 via one or more handle axes 465 for hand held use. Specifically, one or more of the handles 460 may be rotatable around the respective handle axes 465. In some embodiments, the handle axes 465 may define a lateral axis of the third axis assembly 400 as indicated by the dashed line in FIG. 4. In some embodiments, one of the handles 460, the handle axis 465, and/or the height adjustable handle mounts 457 may be removable. For example, in some embodiments the handle 460, handle axis 465, and height adjustable handle mount 457 that is not coupled with the third axis stabilizing motor 451 (i.e. is on the left side of the drawing of FIG. 4) may be removable. In some embodiments, a portion of the cross arm 454, for example the portion of the cross arm 454 to the left of the bracket mounting plate 453 in FIG. 4, may likewise be removable.

In some embodiments, the optical center 110 of the camera 100 may be between approximately 2 and 6 centimeters above the lateral axis of the third axis assembly 400 when the camera is coupled with the stabilization apparatus 200. In other embodiments the optical center 110 of the camera 100 may be closer or further from the lateral axis in the z direction. Generally, the lateral axis may be aligned with a center of gravity of the combined stabilization apparatus 200 and the third axis assembly 400 when the third axis assembly 400 is coupled with the stabilization apparatus 200 as discussed below. The distance by which the optical center 110 of the camera 100 is offset from the lateral axis may be based on the type of camera 100, the design of the camera 100, the weight of the camera 100, the distribution of weight of the camera 100, and/or accessories mounted to one or more of the camera 100, the stabilization device 200, and the third axis assembly 400.

Figure 5:
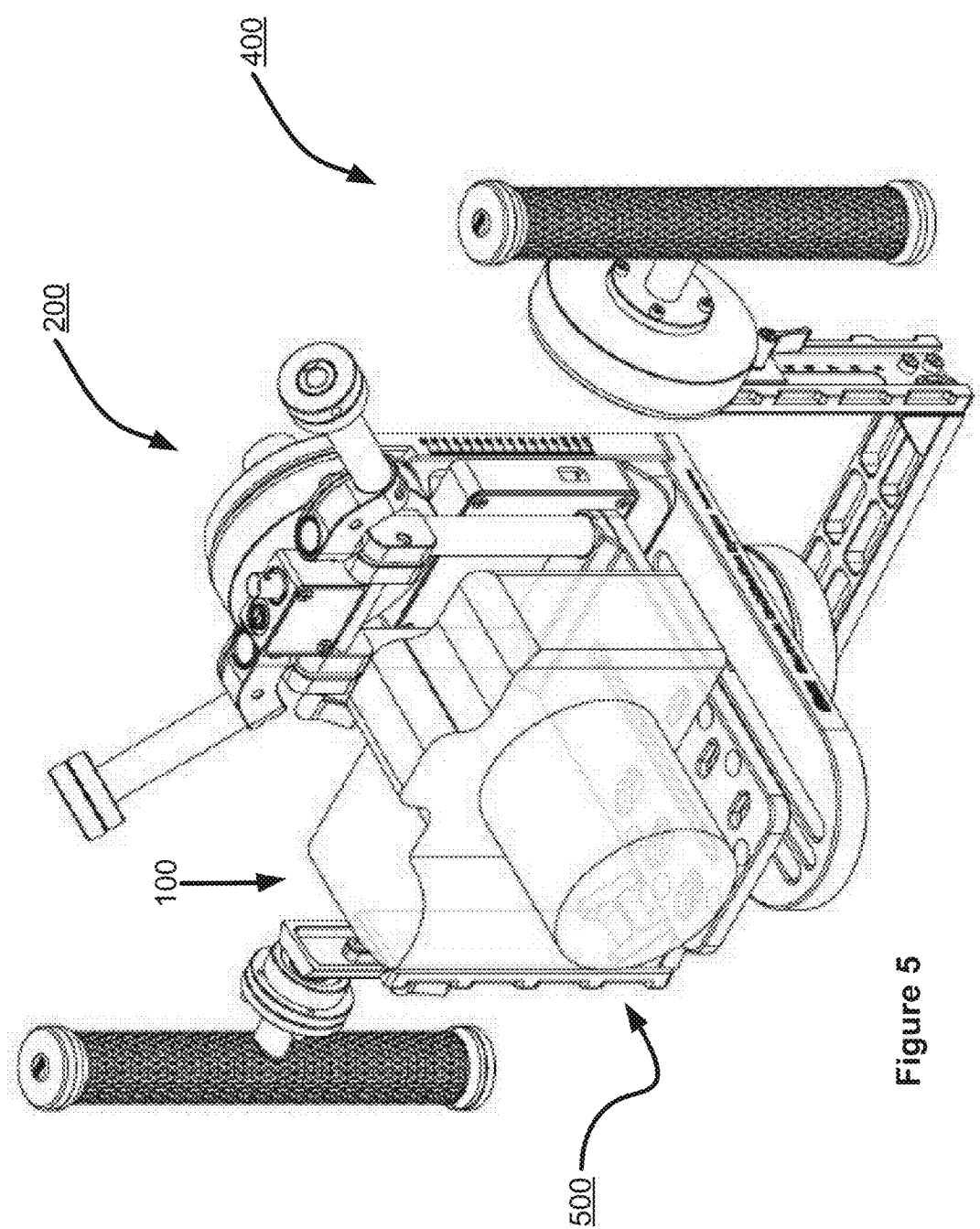
FIG. 5 is an upper perspective view of an extended stabilization apparatus that includes the stabilization apparatus coupled with the third axis assembly, in accordance with various embodiments.

In embodiments, the third axis assembly 400 may be added to the stabilization apparatus 200 if a user desires an additional stabilization element. As discussed above, the third axis assembly 400 may attach to the pan/tilt axis assembly 220 by coupling base mounting plate 223 to axis bracket mounting plate 453. FIG. 5 depicts an example extended stabilization apparatus 500 that depicts the stabilization apparatus 200 coupled with the third axis assembly 400. FIG. 5 further depicts an example orientation of a camera 100 with regard to the extended stabilization apparatus 500.

In embodiments, the third axis assembly 400 may be vertically adjustable via the height adjustable handle mounts 457 to allow for balancing different camera configurations as needed. In some embodiments, the extended stabilization apparatus 500 may be configured according to an underslung configuration such that the camera 100 and stabilization apparatus 200 are cradled in a U-shaped setup as shown in FIG. 5. In other embodiments, the third axis assembly 400 may be flipped such that the handles 460 and the stabilization apparatus 200 are below the cross arm 454 (not shown).

In addition to stabilization, the third axis stabilizing motor 451 may be manually controlled for producing manual third axis functions via an external control interface. For example, as described above, one of the handles 460 may be configured to rotate around the handle axis 465. For example, as shown in FIG. 4, the rightmost handle 460 may be configured to rotate around the handle axis 465. The rightmost handle 460 may be coupled with the third axis stabilizing motor 451 as depicted in FIG. 4, and rotation of the handle 460 may cause activation of the third axis stabilizing motor 451, which in turn may result in movement of the third axis assembly 400 around the lateral axis of the third axis assembly 400. In embodiments, the third axis assembly 400 and/or the third axis stabilizing motor 551 may be coupled with and controlled by the power/signal distribution system 340, as described above with respect to roll stabilizing motor 212 and pan/tilt stabilizing motor 221.

Operation of Various Embodiments

In embodiments, one or more elements of the extended stabilization apparatus 500 may be scaled up or down to accommodate different sized cameras. Additionally, the extended stabilization apparatus 500 and/or the stabilization apparatus 200 may be operated hand held or mounted to a platform. Alternatively, the extended stabilization apparatus 500 and/or the stabilization apparatus 200 may be combined with a vibration dampening system for utilization in a moving vehicle or in environments where un-wanted vibrations may be introduced into the system.

As described above, embodiments of this disclosure use sensors such as gyroscopic sensors and/or accelerometers to detect the x, y, and/or z axis motions of the stabilization apparatus 200, the extended stabilization apparatus 500, and/or a camera system, then counteract and/or smooth their motion through the use of stabilizing motors such as motors 212, 221, and/or 451.

In some embodiments, one or more of the roll axis assembly 210, the pan/tilt axis assembly 220, and/or the third axis assembly 400 may be switched to an adjustable "follow mode." In some embodiments, this activation of "follow mode" for one of assemblies 210, 220, and/or 400 may be independent of another of assemblies 210, 220, and/or 400. This follow mode may detect the user's physical motion inputs on the stabilizing systems, and mimic the same move in a dynamically smoothed out motion via the stabilizing motors 212, 221, and/or 451. This may allow the user's intentional camera moves to be re-created in a more stabilized motion.

In some embodiments the extended stabilization apparatus 500 may be configured to seamlessly transition between a normal mode wherein the handles 460 are generally laterally parallel with one another to a "suitcase" mode wherein the handles are generally vertically parallel with one another. In other words, the extended stabilization apparatus 500 may be able to rotate by 90 degrees such that a user may hold one of the handles 460 by one hand and allow the remainder of the extended stabilization apparatus 500 to hang below that handle 460 (i.e. suitcase mode). As used herein, "seamlessly" may mean that a video shot by the camera 100 while the extended stabilization apparatus 500 transitions between normal mode and suitcase mode may have little to no noticeable fluctuation in the horizon of the video. In other words, the roll orientation of the camera 100 may stay constant or approximately constant during the transition from normal mode to suitcase mode. "Seamlessly" may also refer to embodiments wherein the extended stabilization apparatus 500 may transition from normal mode to suitcase mode in a way such that a user can maintain one hand on the handle 460 used for normal mode while removing the other hand from the apparatus 500. Likewise, a user may transition from suitcase mode to normal mode by grabbing the other handle 460 and rotating the apparatus 500 by 90 degrees. In this embodiment, the gyroscopic sensors and/or accelerometers may detect the rotation of the extended stabilization apparatus 500 and counter-act that rotation via the roll axis assembly 210 and specifically the roll stabilizing motor 212 such that the orientation of the camera 100 around the x axis remains constant. In some embodiments, the suitcase mode may involve holding the handle 460 that is coupled with the third axis stabilizing motor 451 as described above.

As described above, in some embodiments the optical center 110 of the camera 100 may be aligned with or coincidental with the rotational axis of the roll stabilizing motor 212 (e.g., the x axis of the roll axis assembly 210). This alignment may allow roll motion of the camera while maintaining images along the optical center 110 to stay at that optical center 100, even with a full 360 degree (or more) range of motion around the optical center 110 of the camera 100. Additionally, this alignment may allow the stabilization apparatus 200 and/or the extended stabilization apparatus 500 to rotate 360 degrees around the camera 100 while the camera 100 maintains a level horizon.

This alignment of the optical center 110 of the camera 100 with the x axis of the roll axis assembly 210 may also allow the user to change lenses without re-balancing the roll axis. As described above, because lenses may generally be cylindrical, their weight may be equally balanced around the x axis/optical center 110.

Fourth Axis Assembly

Figure 7:
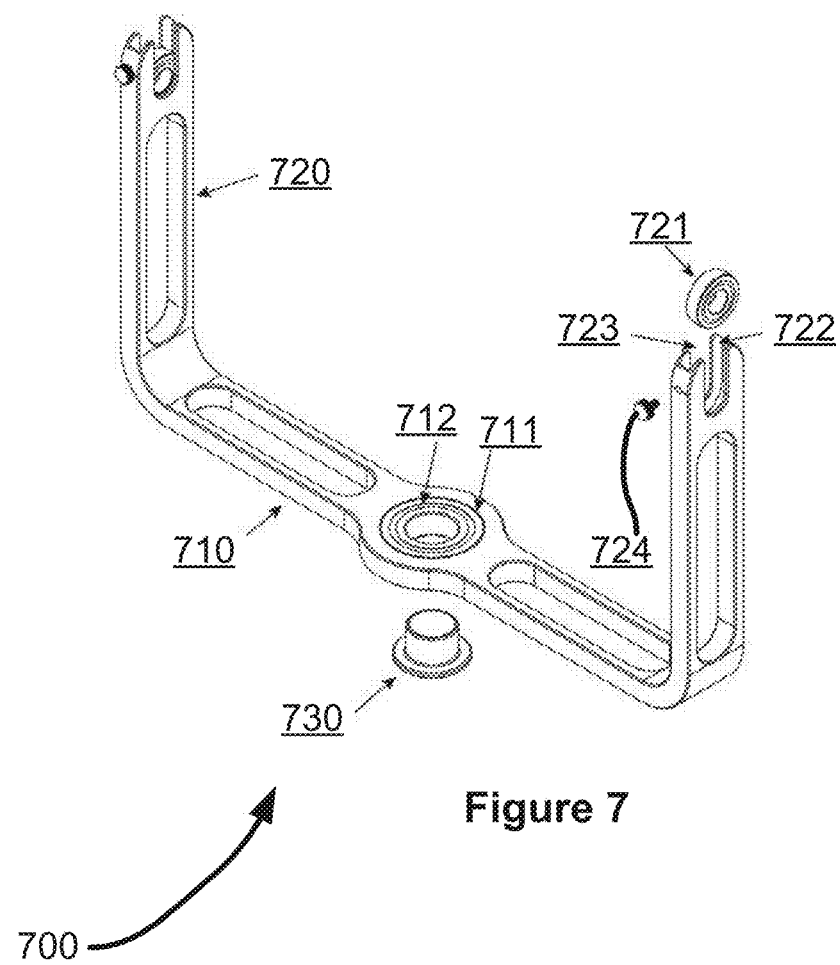
FIG. 7 is an upper perspective view depicting an example of a fourth axis assembly, in accordance with various embodiments.

FIG. 7 depicts a fourth axis assembly 700 that may be coupled with the extended stabilization apparatus 500 depicted in FIG. 5. The fourth axis assembly 700 may include a cross bar 710 that may house one or more of the pan bearings such as pan bearing 712 in a pan bearing mounting hole 711. The pan bearing 712 may be coaxial with the rotational bearing 224 depicted in FIG. 2. The cross bar 710 may support one or more the riser bars 720 as well as the weight of the fourth axis assembly 700 and/or the extended stabilization apparatus 500 while allowing free pan rotation of the fourth axis assembly 700 and/or the extended stabilization apparatus 500.

In embodiments, the cross bar 710 may be either top mounted or bottom mounted. In bottom mounted mode, the cross bar 710 may rest on a third party support arm via the spacer ring 730. For example, the cross bar 710 may rest on a tripod, a user-mountable harness, or some other third party support. In top mount mode, the cross bar 710 may be swung up to be above the extended stabilization apparatus 500 and supported from above. In this embodiment, the cross bar 710 may be mounted to a cable suspension system or camera crane or attached to a handle for a low angle shot.

In embodiments, the cross bar 710 may be manufactured in different widths to accommodate different sizes and weights of camera stabilizer systems. The riser bars 720 may attach to the cross bar 710 and extend vertically. The riser bars 720 may include one or more bearings and/or a mounting mechanism for attaching to the extended stabilization apparatus 500, as described further below.

Specifically, the riser bars 720 may attach vertically to the cross bar 710. The riser bar(s) 720 may removably house tilt bearings 721 in the tilt bearing slot 722. Specifically, the tilt bearings 721 may be coupled with the handle axes 465 such that the handle axes 465 are generally nested within the tilt bearing slot 722. In embodiments, the fourth axis assembly 700 may further include a support clearance slot 723 cut into the riser bars 720 for clear coupling with the extended stabilization apparatus 500. A bearing lock screw 724 may allow for removal of the extended stabilization apparatus 500 from the fourth axis assembly 700. Additionally, the bearing lock screws 724 may keep the tilt bearings 721 from sliding out of the tilt bearing slot 722 when the fourth axis assembly 700 is hung upside down from above as earlier described. In embodiments, the riser bars 720 may be manufactured in different heights to best accommodate different height extended stabilization apparatuses 500.

The spacer ring 730 may allow the fourth axis assembly 700 to be mounted to a variety of third party support systems by providing a matching mounting point of the proper diameter for interfacing with the pan bearing 712. Specifically, the spacer ring 730 may interface with the cross bar 710 via the pan bearing 712. The spacer ring 730 may be used as a universal mounting solution for a variety of third party camera support options. Various spacers may be available to match up to different brands of third party accessories as described above. The outside diameter of the spacer ring 730 may match the inside diameter of the pan bearing 712. Generally, the spacer ring 730 may be the integral connection point between the fourth axis assembly 700 and third party camera mounting systems as described above. Different embodiments may be produced to match up to a wide variety of mounting situations for both upright and upside down mounting configurations.

As described above, the cross bar 710 may house the pan bearing mounting hole 711 and pan bearing 712. Extending up vertically from the ends are the riser bars 720. The riser bars may be cut with a tilt bearing slot 722 that may have a width matching the outer diameter of the tilt bearing 721. The tilt bearing 721 may be attached to the extended stabilization apparatus 500 and slide snugly into the tilt bearing slot 722, as described above. Further, the support clearance slot 723 may allow the handle axis 465 on which the tilt bearing 721 is attached to clear the riser bar 720. A bearing lock screw 724 may be inserted into the riser bars 720 and hold the tilt bearing 721 firmly in place. The entire assembly may interface with third party camera mounting supports via the spacer ring 730 which may be inserted into the cross bar 710 via the pan bearing 712.

Once mounted in the cradle of the fourth axis assembly 700, the extended stabilization apparatus 500 may have free tilt motion on the tilt bearings 721 and free pan motion on the pan bearing 712. Vertical motion may be provided via the third party mounting system to which it is connected via the spacer ring 730. The extended stabilization apparatus 500 may then operate as normal on stabilizing motors 212, 221, and/or 451, as described above. Generally, the tilt bearings 721 and pan bearings 712 may allow the camera stabilizer to move freely about while transferring the weight of the assembly through the spacer ring 730 to the third party support system. This may allow the user to utilize an extended stabilization apparatus 500 with the freedom of a totally hand-held system but without having to carry the weight on his or her forearms. Rather, the weight may be carried by the third party support system and free range of motion is allowed through the additional axis mount and its bearing system. Additionally, the pan and tilt of the extended stabilization apparatus 500 may work independently of the pan and tilt of the fourth axis assembly 700. This independence may allow the extended stabilization apparatus 500 to work properly even if it is hard mounted to a support arm, cable, or crane.

Alternative Embodiments

Figure 10:
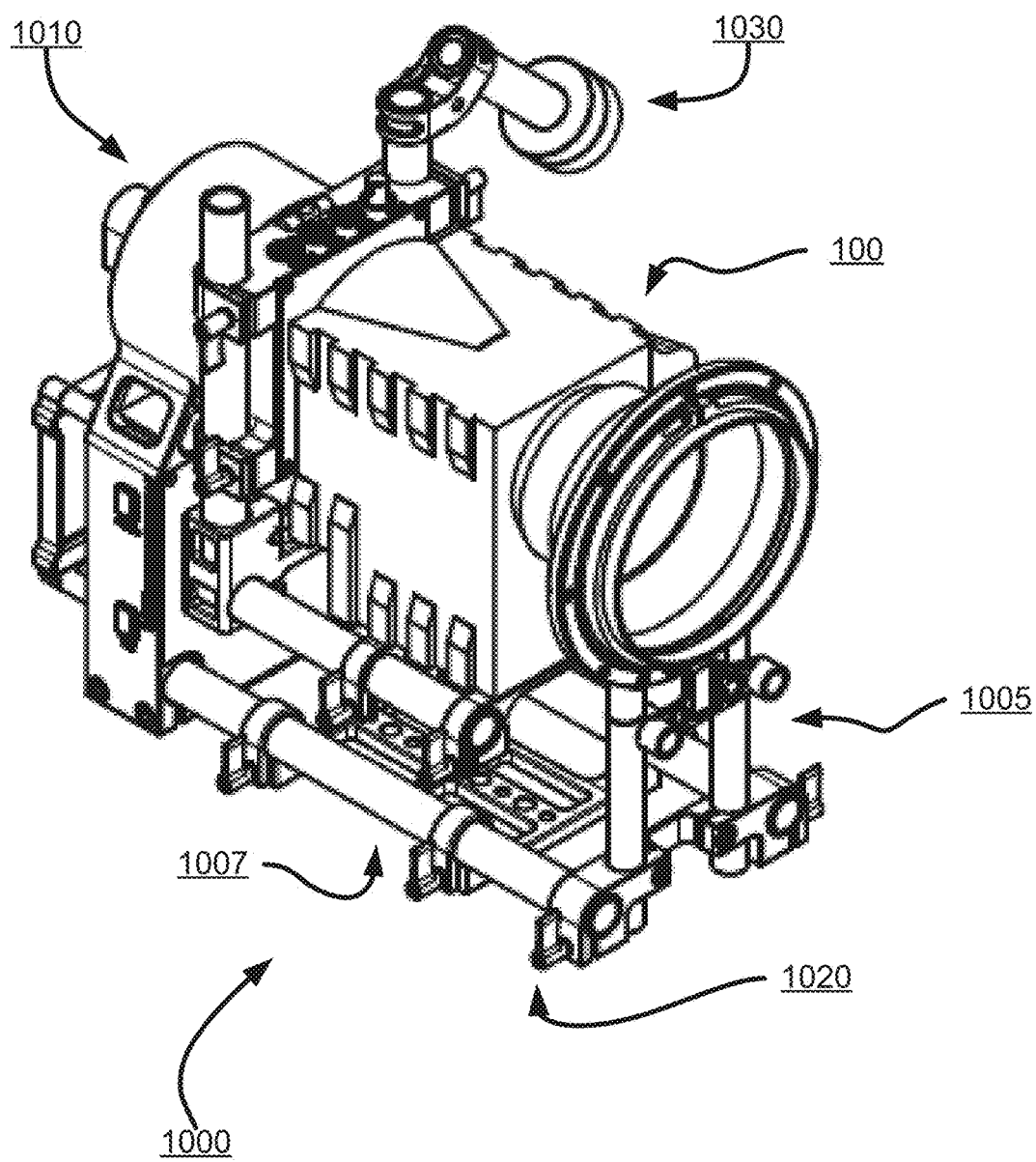
FIG. 10 illustrates an alternative example of a roll axis assembly, in accordance with various embodiments.

FIG. 10 depicts an alternative example of a stabilizing apparatus 1000 with a roll axis assembly 1010, which may be similar to roll axis assembly 210 of FIG. 2. Similar elements between roll axis assembly 1010 and roll axis assembly 210 such as the roll stabilizing motor, roll axis motor mounting plate, camera mounting plate, sensor boards, housing, etc. may not be enumerated in FIG. 10. However, the roll axis assembly 1010 may include elements similar to those elements of FIG. 2 described above, or other elements of alternative embodiments described herein.

Generally, the roll axis assembly 1010 may be configured to couple with a camera 100. In some embodiments, the roll axis assembly 1010 may have an additional camera support structure 1005 that may be configured to support the camera 100, and particularly a lens portion of the camera. Additionally, the roll axis assembly 1010 may be configured to couple with a pan/tilt axis assembly 1020 that may be similar to pan/tilt axis assembly 210 of FIG. 2. As described with respect to FIG. 2, in some embodiments the pan/tilt axis assembly 1020 may not include a pan/tilt stabilizing motor. Rather, in some embodiments the pan/tilt stabilizing motor may be separated from the pan/tilt axis assembly 1020, as shown in FIG. 10, and coupled with a third axis assembly. Similar elements between pan/tilt axis assembly 1020 and pan/tilt axis assembly 220 such as the rotational bearing, pan/tilt motor mounting plate, base mounting plate, etc. may not be specifically enumerated in FIG. 10. However, the pan/tilt axis assembly 1020 may include elements similar to those elements of FIG. 2 described above, or other elements of alternative embodiments described herein.

In embodiments, the camera support structure 1005 may be coupled with the roll axis assembly, and configured to expand or contract along lengthening rods 1007 of the pan/tilt axis assembly 1020 such that cameras of different lengths may be accommodated by the stabilizing apparatus 1000. In some embodiments, the roll axis assembly 1010 may be coupled with a tri-axial weight balancing assembly 1030 that may be similar to, and may include elements similar to, the tri-axial weight balancing assembly 230 of FIG. 2. In some embodiments, as shown in FIG. 10, the tri-axial weight balancing assembly 1030 may only include a single weight rod clamp, counter-weight rod, and/or counter weight.

Figure 11:
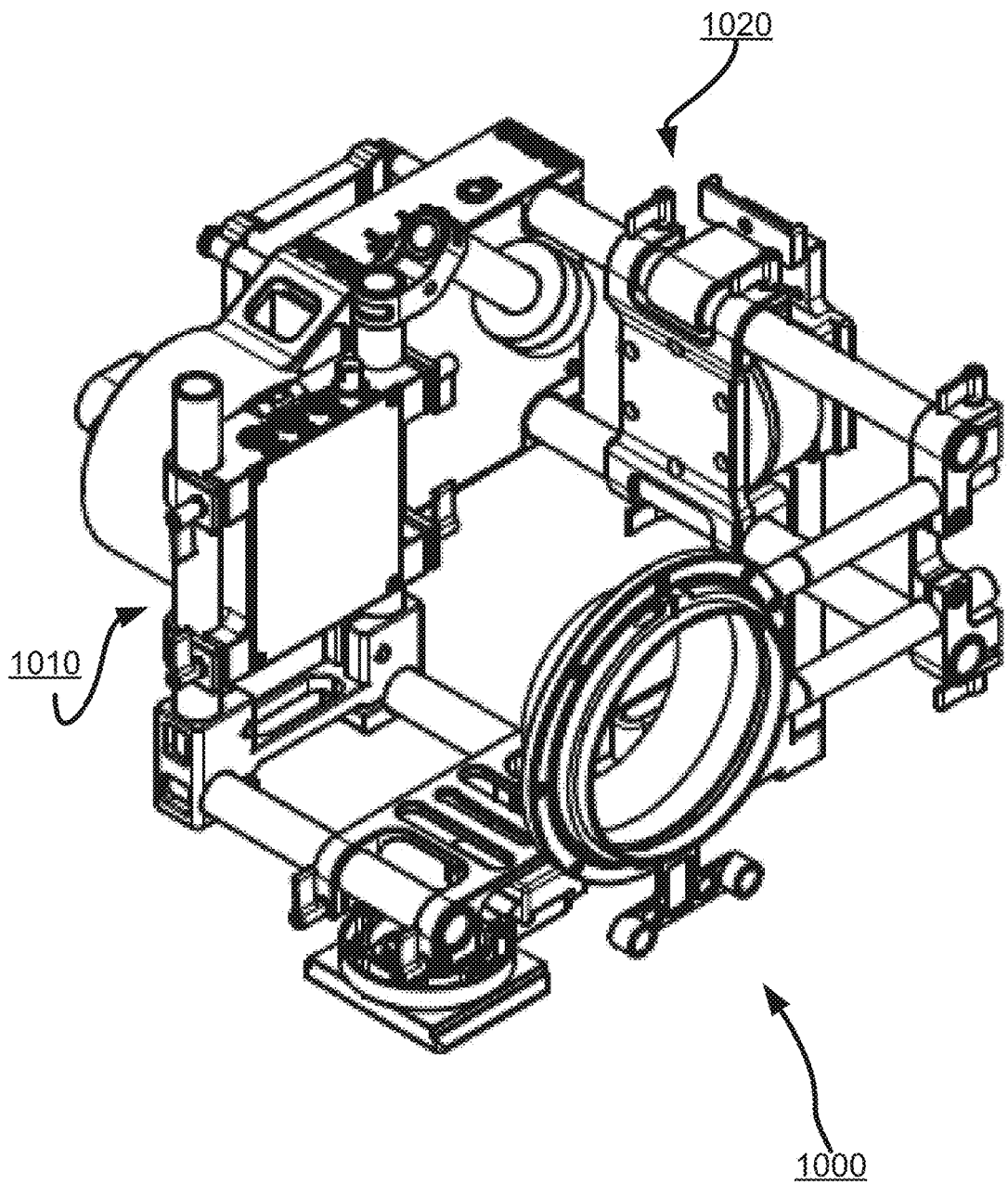
FIG. 11 illustrates an alternative example of an extended stabilization apparatus, in accordance with various embodiments.

FIG. 11 depicts an alternative example of the stabilizing apparatus 1000. As can be seen in FIG. 11, the pan/tilt axis assembly 1020 may be rotated 90 degrees with respect to the roll axis assembly 1010.

Figure 12:
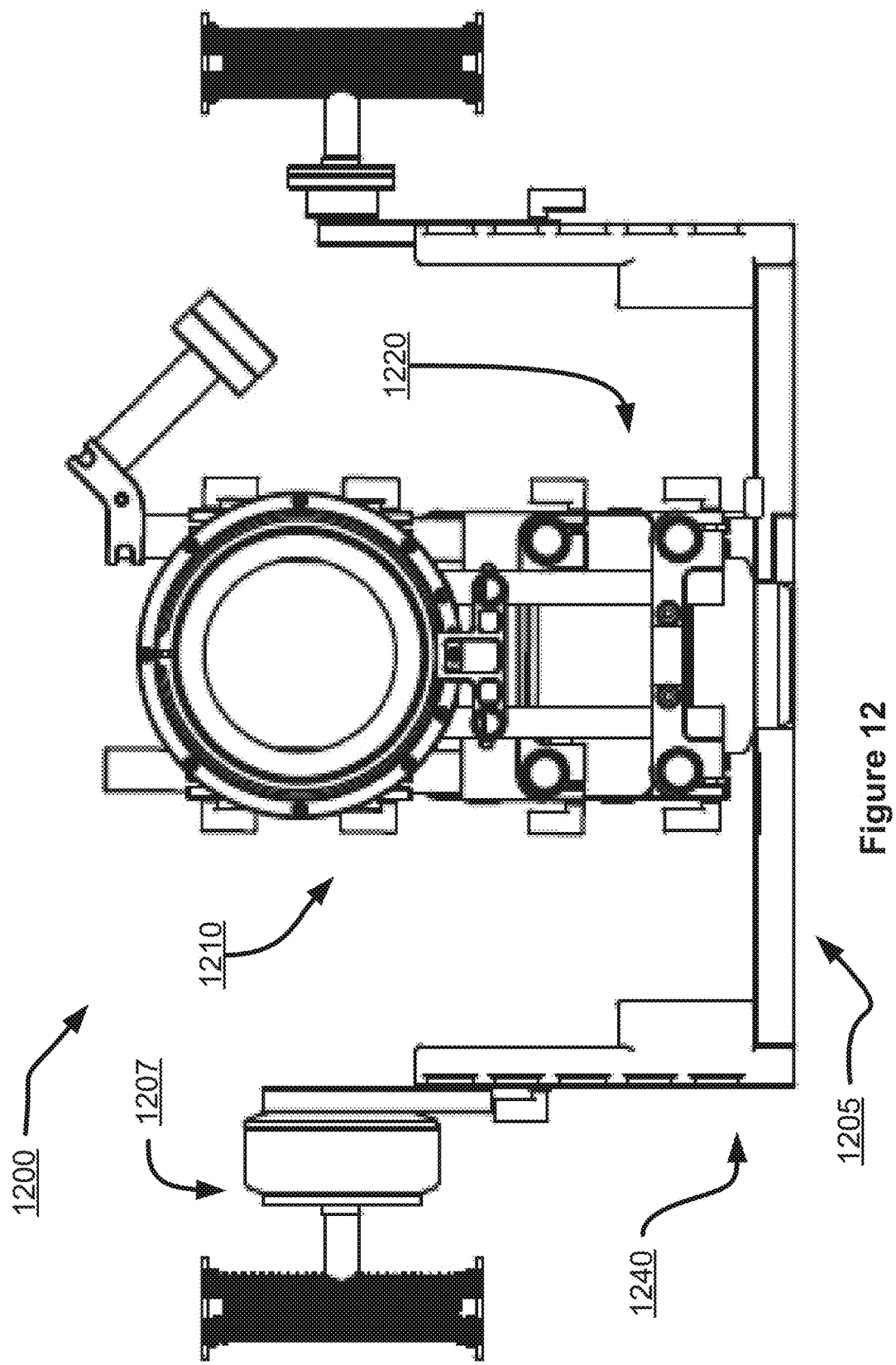
FIG. 12 illustrates an alternative example of an extended stabilization apparatus, in accordance with various embodiments.

FIG. 12 depicts an example of an extended stabilization apparatus 1200 that may include a roll axis assembly 1210 that may be similar to roll axis assembly 1010, a pan/tilt axis assembly 1220 that may be similar to pan/tilt axis assembly 1020, and a third axis assembly 1240 that may be similar to third axis assembly 400. Similar elements between the third axis assembly 1240 and third axis assembly 400 such as the rotational bearing, handles, or motor mounting plate may not be specifically enumerated in FIG. 12. However, the third axis assembly 1240 may include elements similar to those of FIG. 4 described above, or other elements of alternative embodiments described herein.

Specifically, the third axis assembly 1240 may include a cross arm 1205 that may be similar to cross arm 454 of FIG. 4. The third axis assembly 1240 may further include a third axis stabilizing motor 1207 that may be similar to third axis stabilizing motor 451.

Figure 13:
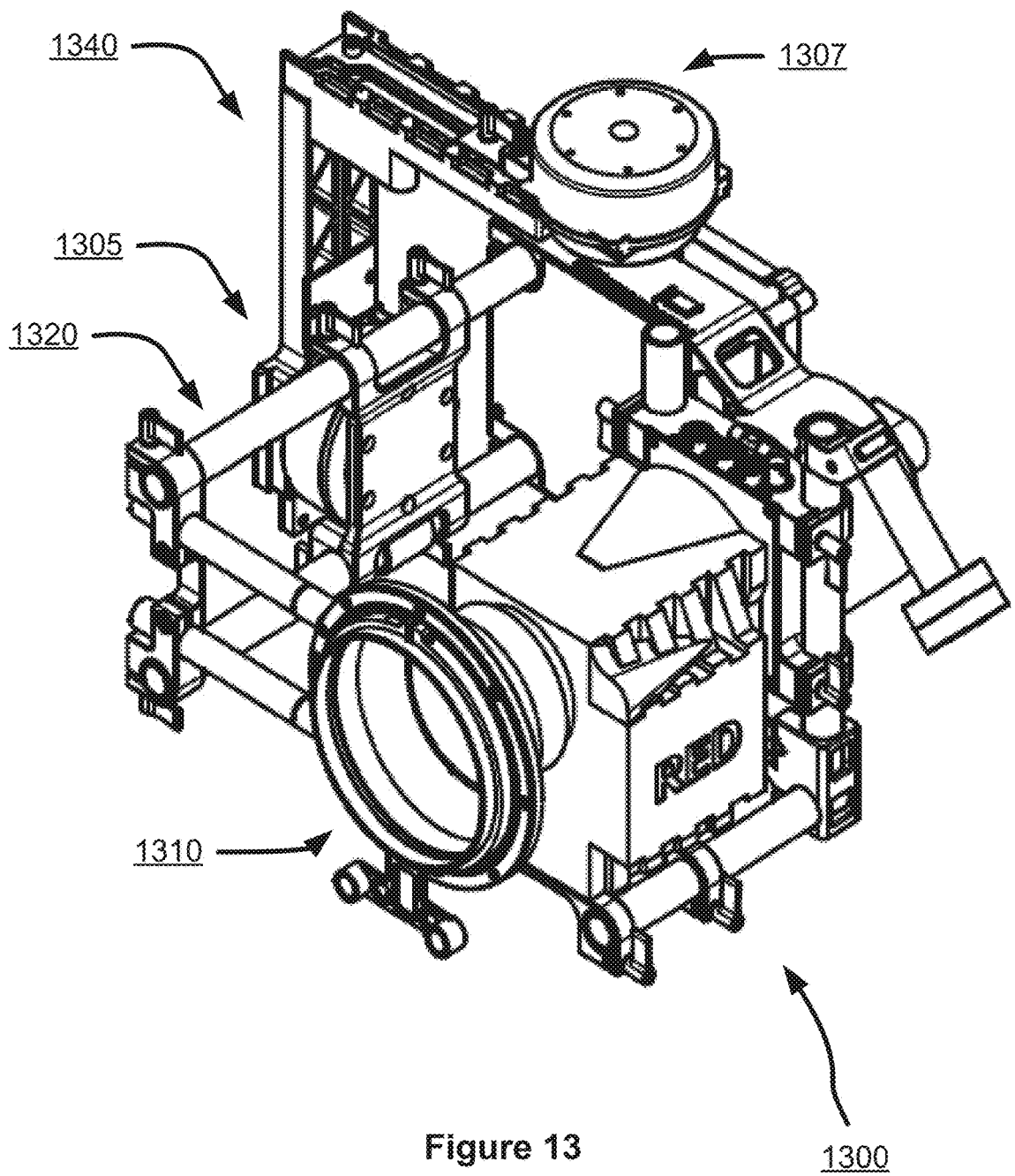
FIG. 13 illustrates an alternative example of an extended stabilization apparatus, in accordance with various embodiments.

Similarly to the cross arm 454 of FIG. 4, in some embodiments portions of the cross arm 1205 and the third axis assembly 1240 opposite the third axis stabilizing motor 451 may be detachable. For example, FIG. 13 depicts an example of an extended axis assembly 1300 that may be similar to extended axis assembly 1200. Extended axis assembly 1300 may include a roll axis assembly 1310 and a pan/tilt axis assembly 1320 that may be respectively similar to roll axis assembly 1210 and pan/tilt axis assembly 1220. The extended axis assembly 1300 may further include a third axis assembly 1340 with a cross arm 1305 and a third axis stabilizing motor 1307 that may be similar to cross arm 1205 and third axis stabilizing motor 1207. In this configuration, the third axis stabilizing motor 1307 may be located generally over the roll axis assembly 1310, and the portion of the cross arm 1305/third axis assembly 1340 opposite the third axis stabilizing motor 1307 may be removed. In this configuration, the extended stabilization apparatus 1300 may be said to be in "flight mode" and configured to couple with another apparatus such as a drone, a camera boom, or some other apparatus. In this configuration, the extended stabilization apparatus 1300 may be configured to hang under the drone/boom/etc. to produce video with a "flying" type effect, or it may be configured to sit upon a tripod or other mount such that it is able to move about 1, 2, or 3 axes in response to electrical or electromagnetic signaling. Embodiments of at least FIGS. 2-5 and 10-13 herein may be considered as alternative embodiments, and other configurations may be used in other embodiments to couple the various assemblies described herein. Additionally, in some embodiments different elements may be combined differently. For example, in one embodiment the stabilization apparatus 1100 may be coupled with the third axis assembly 400 of FIG. 4.

Additional Elements

Figure 8:
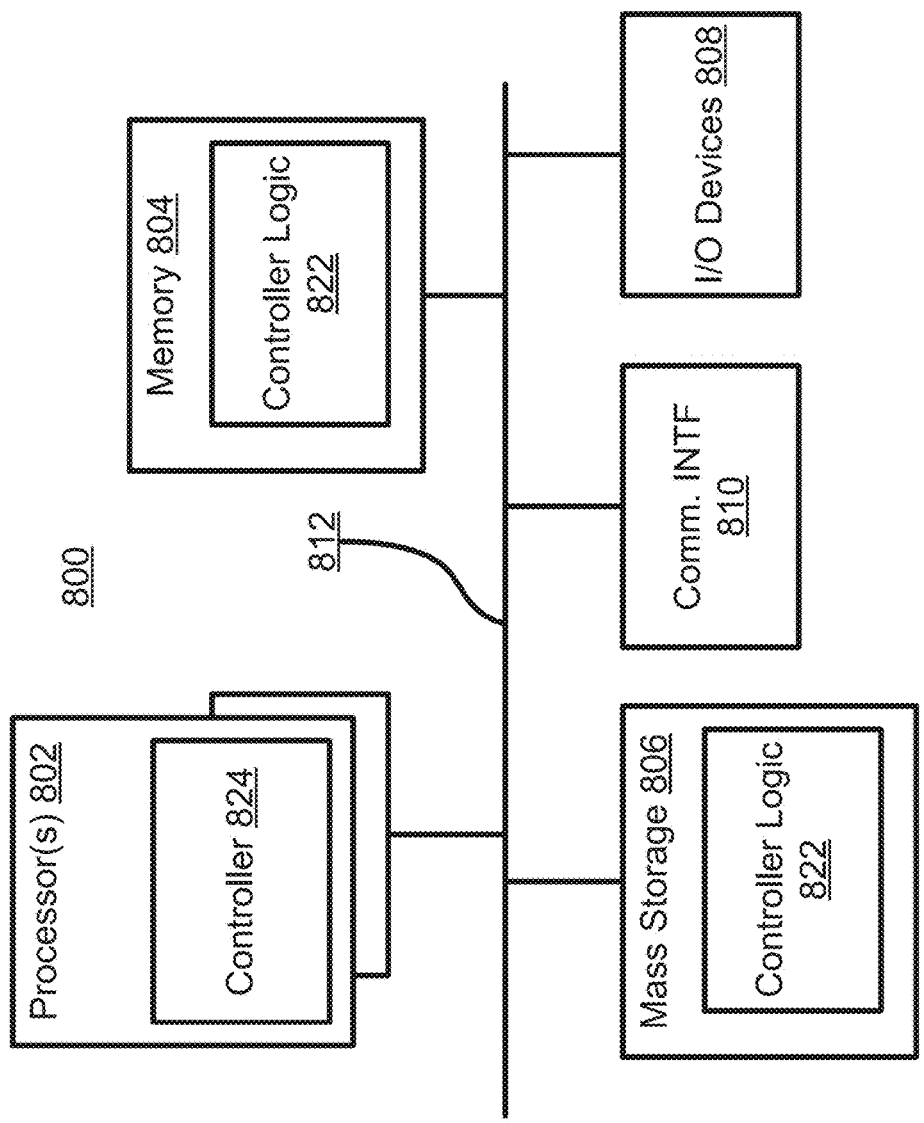
FIG. 8 illustrates an example computer system suitable for use to practice various aspects of the present disclosure, in accordance with various embodiments.

FIG. 8 illustrates an example electronic device 800 (e.g., a computer, a server, or some other electronic device) that may be suitable to practice selected aspects of the present disclosure. Specifically, the electronic device 800 may be or include one or more of the circuit boards 341 and/or elements of the power/signal distribution system 340. As shown, electronic device 800 may include one or more processors or processor cores 802 and system memory 804. For the purpose of this application, including the claims, the terms "processor" and "processor cores" may be considered synonymous, unless the context clearly requires otherwise. Additionally, electronic device 800 may include mass storage devices 806 (such as diskette, hard drive, compact disc read-only memory (CD-ROM) and so forth), input/output (I/O) devices 808 (such as display, keyboard, cursor control and so forth) and communication interfaces 810 (such as network interface cards, modems and so forth). The elements may be coupled to each other via system bus 812, which may represent one or more buses. In the case of multiple buses, they may be bridged by one or more bus bridges (not shown). In embodiments, the processor(s) 802 may be or include one or more of the controllers 824 configured to perform the operations described herein. In some embodiments, one or more elements of the electronic device 800 may be distributed between the power/signal distribution system 340 and an external electronic device. The power/signal distribution system 340 may be coupled with the external electronic device by way of, for example, power/signal plug connector(s) 342.

Each of these elements may perform its conventional functions known in the art. In particular, in some embodiments, system memory 804 and mass storage devices 806 may be employed to store a working copy and a permanent copy of the programming instructions configured to cooperate with controllers 824 to perform the operations associated with the stabilization processes described herein, collectively referred to as controller logic 822. The various elements may be implemented by assembler instructions supported by processor(s) 802 or high-level languages, such as, for example, C, that can be compiled into such instructions.

Figure 9:
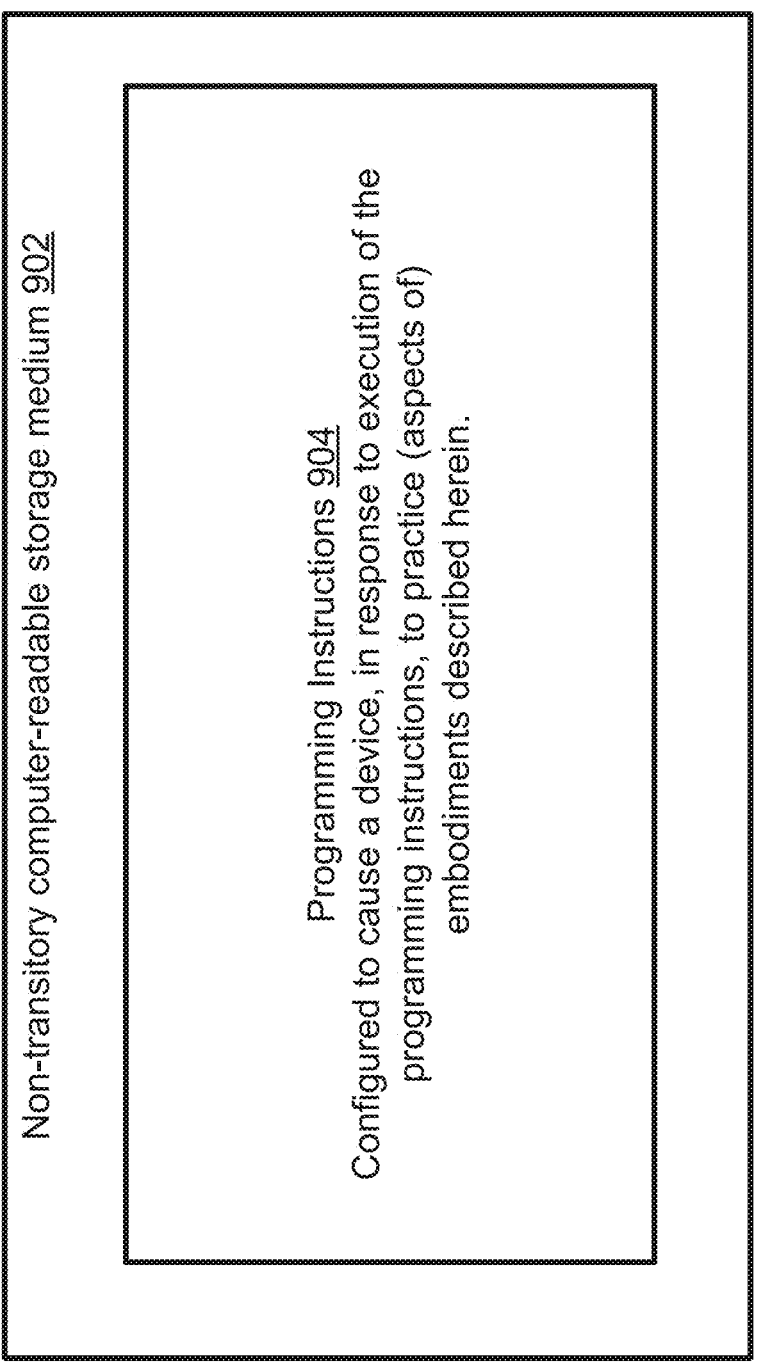
FIG. 9 illustrates a storage medium having instructions for practicing processes associated with the stabilization apparatus, in accordance with various embodiments.

As will be appreciated by one skilled in the art, the present disclosure may be embodied as methods or computer program products. Accordingly, the present disclosure, in addition to being embodied in hardware or logic as earlier described, may take the form of an entire software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., electronic device 800, stabilization apparatus 200, and/or extended stabilization apparatus 500, 1000, 1200, or 1300, in response to execution of the programming instructions, to perform, e.g., various operations associated with the stabilization processes described herein. In alternate embodiments, programming instructions 904 may be disposed on multiple computer-readable non-transitory storage media 902 instead. In alternate embodiments, programming instructions 904 may be disposed on computer-readable transitory storage media 902, such as signals.

Any combination of one or more computer-usable or computer-readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency (RF), etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments may be implemented as a computer process, a computing system or an article of manufacture such as a computer program product of computer-readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 8, for one embodiment, at least one of processors 802, and specifically the controller 824, may be packaged together with memory having controller logic 822 (in lieu of storing on memory 804 and storage 806). For one embodiment, at least one of processors 802 may be packaged together with memory having controller logic 822 to form a System in Package (SiP). For one embodiment, at least one of processors 802 may be integrated on the same die with memory having controller logic 822. For one embodiment, at least one of processors 802 may be packaged together with memory having controller logic 822 to form a System on Chip (SoC).

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:
1. An apparatus comprising:
a roll axis assembly that includes:
a camera mounting plate to directly physically couple with a camera such that an optical axis of the camera is parallel with the camera mounting plate and parallel with a first roll axis of the apparatus; and a roll motor directly coupled with the camera mounting plate such that an axis of the roll motor is coaxial with the roll axis of the apparatus, the roll motor to rotate the camera mounting plate about the roll axis, wherein the roll motor is to rotate the camera mounting plate about the roll axis without rotating any other axis assembly.

2. The apparatus of claim 1, further comprising a pan and tilt axis assembly coupled with the roll axis assembly, the pan and tilt axis assembly to rotate the camera mounting plate around a second axis of the apparatus that is perpendicular to the roll axis of the apparatus.

3. The apparatus of claim 2, further comprising one or more weights coupled with the roll axis assembly.

4. The apparatus of claim 2, further comprising a power/signal distribution system coupled with the roll axis assembly, wherein the power/signal distribution system includes circuitry coupled with the roll motor to cause the roll motor to rotate the roll axis assembly about the roll axis in response to a signal from a sensor coupled with the power/signal distribution system.

5. The apparatus of claim 4, wherein the power/signal distribution system is coupled with the roll motor via an electrical slip ring.

6. The apparatus of claim 2, further comprising a third axis assembly removably coupled with the pan and tilt axis assembly, wherein the third axis assembly includes:

a cross arm;

a stabilizing motor coupled with the cross arm; and a handle coupled with the stabilizing motor via a handle mount that defines a handle axis such that rotation of the handle about the handle axis causes the stabilizing motor to rotate the roll axis assembly around a third axis perpendicular to the first axis and the second axis.

7. The apparatus of claim 6, further comprising a fourth axis assembly coupled with the third axis assembly, wherein the fourth axis assembly includes:

a riser bar coupled with the handle mount; and a cross bar coupled with and perpendicular to the riser bar, wherein the cross bar includes a pan bearing mounting hole to be coupled with a user-wearable harness.

8. The apparatus of claim 6, wherein the apparatus is to transition from a normal mode wherein the handle axis is oriented horizontally to a suitcase mode wherein the handle axis is oriented vertically.

9. The apparatus of claim 1 wherein the camera mounting plate is to directly physically couple with the camera such that there is no intervening axis assembly between the camera mounting plate and the camera.

* * * * *